No. 877,117. PATENTED JAN. 21, 1908.
J. PEIL.
INSECT DESTROYING MACHINE.
APPLICATION FILED JULY 17, 1907.

5 SHEETS—SHEET 1.

Witnesses
Inventor
J. Peil
By
Attorneys

No. 877,117.

PATENTED JAN. 21, 1908.

J. PEIL.
INSECT DESTROYING MACHINE.
APPLICATION FILED JULY 17, 1907.

5 SHEETS—SHEET 2.

Witnesses

Inventor
J. Peil
By
Attorneys

No. 877,117. PATENTED JAN. 21, 1908.
J. PEIL.
INSECT DESTROYING MACHINE.
APPLICATION FILED JULY 17, 1907.
5 SHEETS—SHEET 3.
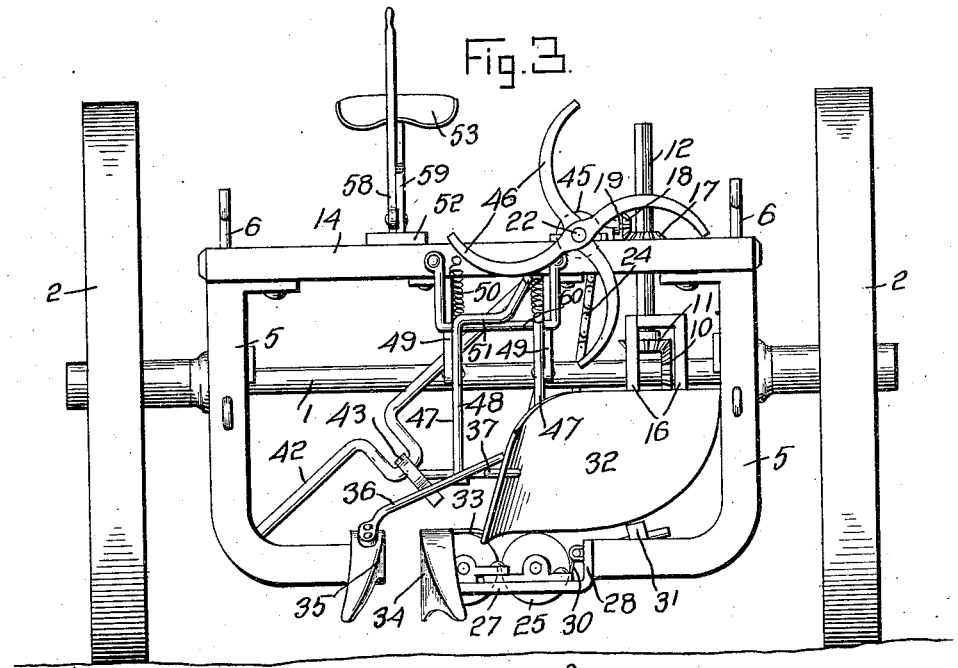
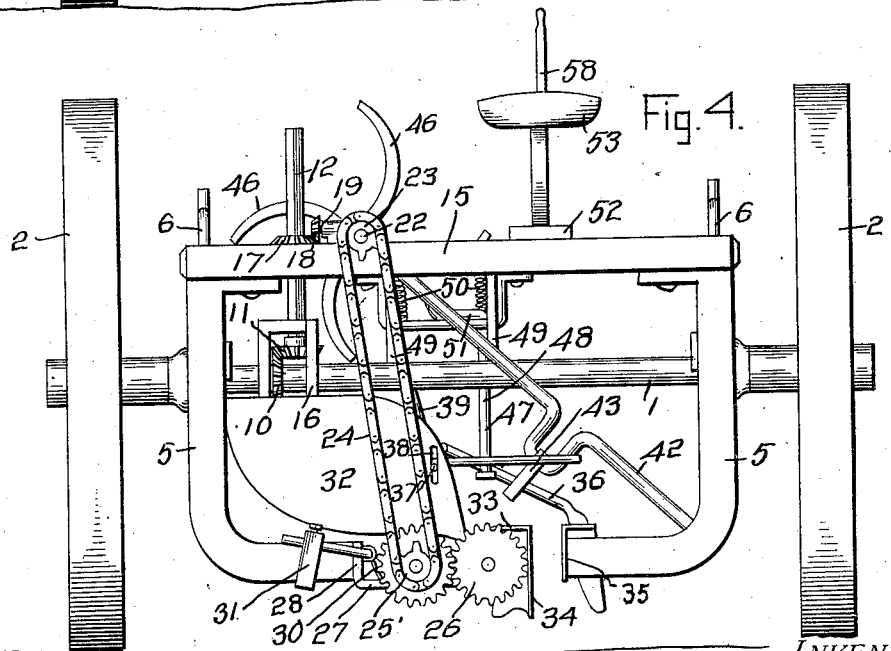
WITNESSES:
INVENTOR
Attorneys No. 877,117.

PATENTED JAN. 21, 1908.

J. PEIL.
INSECT DESTROYING MACHINE.
APPLICATION FILED JULY 17, 1907.

5 SHEETS—SHEET 4.

WITNESSES:

INVENTOR

No. 877,117.
PATENTED JAN. 21, 1908.
J. PEIL.
INSECT DESTROYING MACHINE.
APPLICATION FILED JULY 17, 1907.
5 SHEETS—SHEET 5.
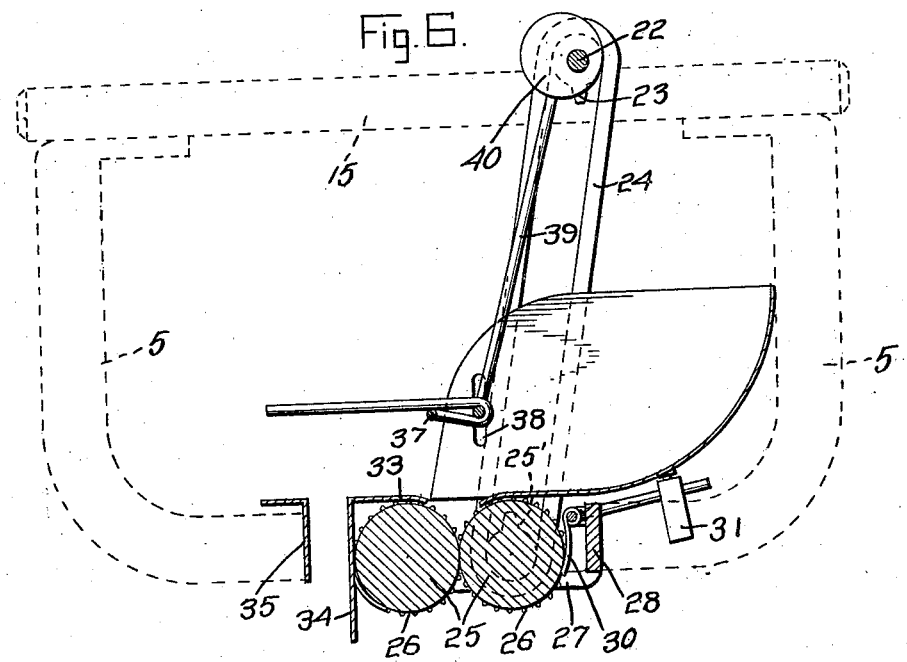
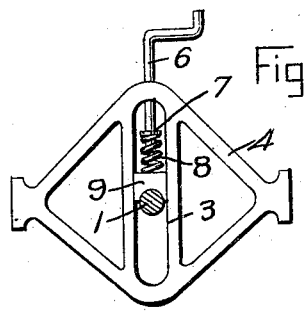
WITNESSES:
INVENTOR
J. Peil
BY
Attorneys

UNITED STATES PATENT OFFICE.

JOSEPH PEIL, OF BLOOMER, WISCONSIN.

INSECT-DESTROYING MACHINE.

No. 877,117.  Specification of Letters Patent.  Patented Jan. 21, 1908.

Application filed July 17, 1907. Serial No. 384,161.

*To all whom it may concern:*

Be it known that I, JOSEPH PEIL, a citizen of the United States, residing at Bloomer, in the county of Chippewa, State of Wisconsin, have invented certain new and useful Improvements in Insect-Destroying Machines; and I do hereby declare the following to be a full, clear, and exact description of the invention, such as will enable others skilled in the art to which it appertains to make and use the same.

The present invention has reference to insect-destroying machines adapted, when being drawn through a field to straddle the plants without injury thereto, to effectively remove the insects from the leaves of the plants and to subsequently destroy the insects, the machine being designed especially for exterminating the potato-bugs, which infest the leaves of the potato plant.

To this end the invention resides in the provision of a machine of the above-mentioned type including means for directing the plants into the path of the vibrating beaters, means for operating the beaters, and means for operating the crushing rolls between which the insects fall from the trough into which they are shaken by the action of the beaters.

The invention further consists in the particular construction, combination and arrangement of parts, all as hereinafter fully described, specifically claimed and illustrated in the accompanying drawings in which like characters of reference designate similar parts throughout the several views.

Figure 1:
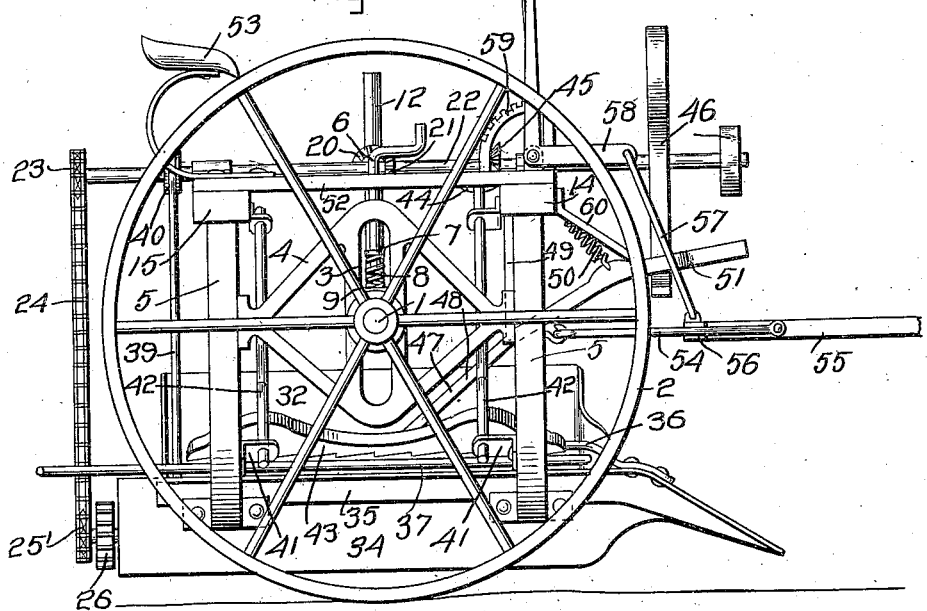
Figure 8:
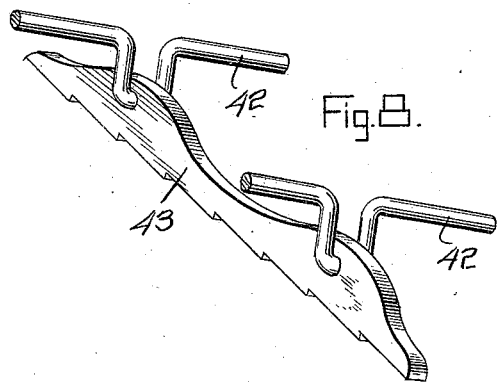
Figure 2:
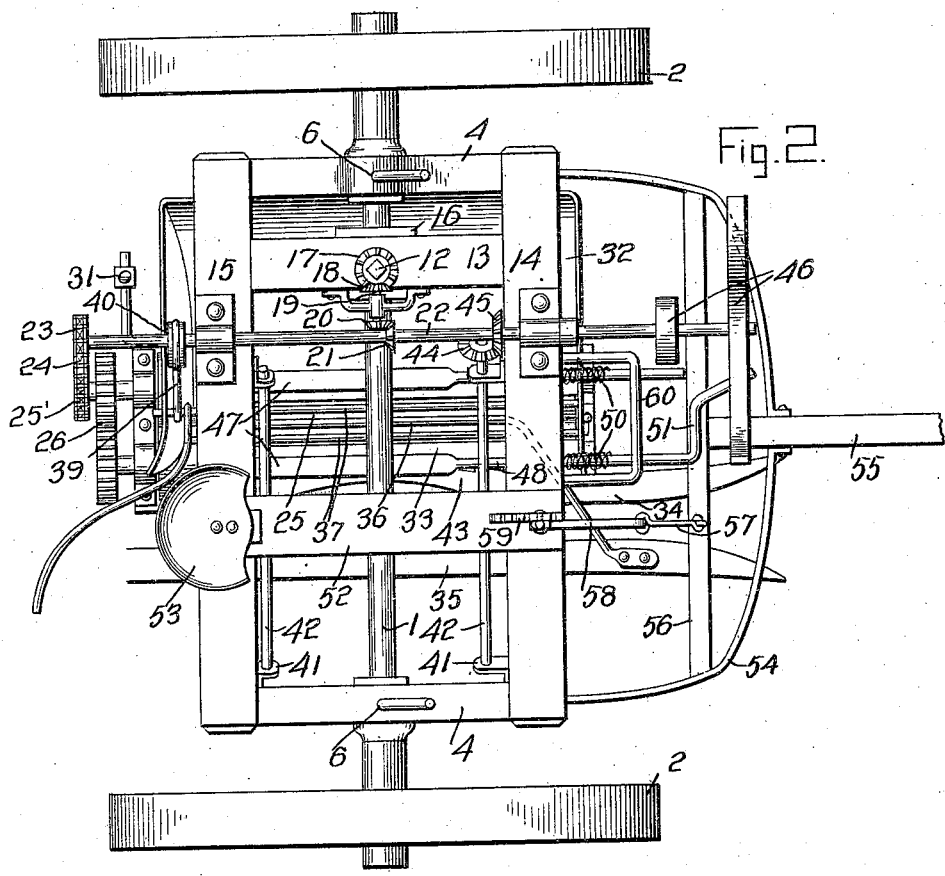
Figure 9:
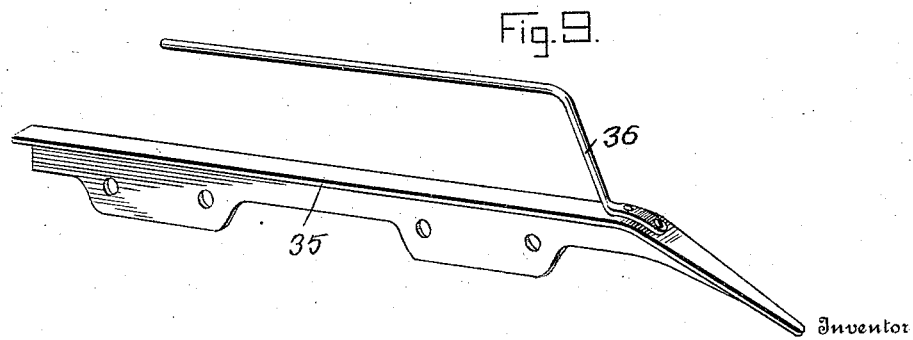
Figure 5:
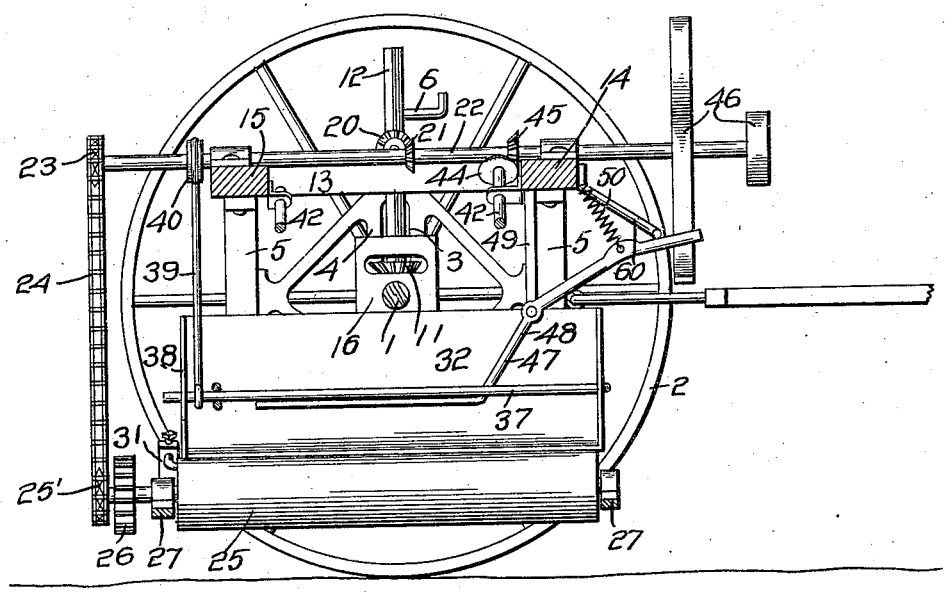

Of the said drawings, Figure 1 is a side elevation of the machine, Fig. 2 is a top plan view thereof, Fig. 3 is a front elevation, Fig. 4 is a rear elevation, Fig. 5 is a longitudinal section through Fig. 2, Fig. 6 is a transverse section taken through Fig. 2 towards the rear end thereof, Fig. 7 is a detailed view of one of the castings Fig. 8, is a detail view of the toothed beater, Fig. 9 is a detail view of the shoe which carries the guide-bar.

Referring more particularly to the drawings, the numeral 1 designates the axle of the machine which carries at its opposite ends the ground wheels 2 and extends adjacent each end through a vertical slot 3 formed in the casting 4 located at each side of the machine between the corresponding front and rear supporting beams 5, to which it is secured. Each casting is provided at its upper end with a threaded opening which communicates with the slot 3, through which opening extends a threaded shaft 6 carrying a collar 7 adjacent its lower end against which collar one end of an expansible coil-spring 8 bears, the opposite end of each spring bearing against the upper face of a block 9, movable vertically in the casting slot and having a curved lower face which rests upon the axle. It will, therefore, be apparent that the frame of the machine may be raised and lowered with respect to the axle, by rotating the shafts 6 in one direction or the other, said shafts having their upper ends bent to form handles.

The axle is provided adjacent the left-hand casting with a pinion 10 which meshes with a similar pinion 11 carried by a vertical shaft 12, journaled intermediate its ends in a bearing formed in the longitudinal beam 13 which connects the front and rear cross-beams 14 and 15 to which the upper ends of the supporting beams 5 are secured. The pinions 10 and 11 are incased by a two-part cage 16 through the upper end of which the shaft 12 extends. This shaft carries upon its squared upper portion a pinion 17 which meshes with a similar pinion 18 secured to a short transversely-disposed shaft 19 provided with a pinion 20 meshing with a second pinion 21 carried by a longitudinally-arranged shaft 22 journaled in bearings secured in the front and rear cross-beams 14 and 15 and projecting therebeyond, at opposite ends. The rotation of the axle is thus transmitted to the last-mentioned shaft, as will be apparent.

The shaft 22 is provided at its rear end with a sprocket 23 connected by a chain 24 with a sprocket 25' located upon the adjacent end of the shaft of one member of a pair of crushing rollers 25 which are rotated towards each other by means of intermeshing gears 26 with which their shafts are provided, said roller-shafts being journaled at opposite ends in bearings mounted upon the laterally-projecting arms 27 of a bar 28 which connects the lower ends of the right-hand supporting beams 5, the bar 28 carrying a U-shaped rocking rod to which a scraper 30 is secured, the scraper being held against the adjacent roll by means of a weight 31 mounted upon one of the arms of said rod.

Secured to the right-hand standards and extending directly over the adjacent crushing roll is a longitudinal trough 32 whose bottom is set at such an angle as to form a downwardly-inclined chute, so that the insects brushed thereonto will be discharged directly into the bite of the rolls to be crushed therebetween, the inner longitudinal edge of the trough being curved so as to more closely approach the adjacent roll. The upper surface of the opposite roll is likewise partly incased throughout its length by a curved longitudinal flange 33 which forms an extension of a metal shoe 34 terminating at its forward end in an out-turned point. Disposed in spaced relation to and parallel with this shoe is a second shoe 35 which is secured to the inturned lower ends of the left-hand supporting beam. The shoe last-mentioned has secured to its upper face a curved turning-rod 36 which is adapted to strike against the plants during their passage between the shoes and to direct them towards the trough side of the machine. The trough is, in addition, provided with a guide 37 which lies directly above the bite of the crushing rolls and is formed by a metal rod bent substantially into U-shape and pivoted at its forward end to the front end piece of the trough, one of the arms of said guide extending through a vertical slot 38 with which the rear end piece of the trough is provided. The arms of the guide are connected together towards their rear end by bending one arm around the other.

The guide is rocked or oscillated in a vertical plane by means of its engagement with the hooked lower end of the strap 39 of an eccentric 40 which is carried by the shaft 22 adjacent the sprocket 23. This movement of the guide against the lower portion of the plants which are directed thereagainst by the turning-rod will therefore dislodge the insects from this portion of the plants, whereupon the insects will fall either between the crushing rolls or onto the flange 33.

Each of the left-hand supporting beams has formed thereon adjacent its lower end a laterally-projecting ear 41 in which one end of a crank-shaft 42 is journaled, said shafts being journaled towards their upper ends in brackets projecting laterally from the front and rear cross-beams 14 and 15. The crank portions of said shafts are pivotally connected to a beater 43 which, in consequence, travels in an elliptical path, said beater having its lower edge serrated, as shown. Rotation of the crank-shaft is effected by means of a pair of intermeshing pinions 44 and 45, the former of which is carried by the forward crank-shaft at its upper end, and the latter by the shaft 22.

The shaft just referred to is provided upon its forward end with a pair of laterally-projecting S-shaped arms 46 which are arranged one in advance of the other and are provided with central openings through which said shaft extends, the arms being arranged at right-angles to each other.

Disposed upon each side of the guide 37 is a beater 47 which extends longitudinally of the machine, each beater having an upwardly and forwardly extending stem 48 provided with a central opening through which the laterally bent lower end of a hanger 49 passes, the hanger being secured at the upper end to the under face of the cross-beam 14. The beaters are further connected with said cross-beam by retractile coil-springs 50 which are disposed slightly to the right of the respective beaters and are connected at opposite ends to the latter and to said cross-beam. Said springs, therefore, tend to hold the forward end of the beater stems in raised position, and to consequently depress the flattened blades or beaters proper.

The S-shaped arms above referred to are so disposed with respect to the beaters that, upon the rotation of the shaft 22 upon which said arms are mounted, the latter will alternately operate the beaters, whose ends are disposed in the path of motion of the curved portions of said arms, the left-hand beater having its stem portion terminating in a lateral extension 51, for this purpose. The beaters will therefore have a slight vibrating movement in a vertical plane, and, at the same time, will be given a slight movement sidewise owing both to the angular disposition of the springs 50 and to the fact that the convex faces of said arms strike their stem portions.

The front and rear cross-beams are further connected by a second beam 52 parallel to the beam 13 above referred to, and upon this beam the seat 53 is mounted. The front supporting beams 5 have pivotally connected thereto the rear ends of the arms of a yoke 54 to which the tongue 55 of the machine is, in turn, secured, said tongue having a cross-beam 56 secured to its rear end which is connected by link 57 with the forward end of an angle lever 58 which is pivotally mounted adjacent a segmental rack 59 carried by the beam 52 at its forward end; owing to this construction the entire machine may be tilted in one direction or the other upon its axle, the lever carrying a spring-pressed pawl by means of which it is retained in adjusted position.

From the foregoing description it will be apparent that, when the machine is drawn through the field, each row of plants will, in turn, pass between the outwardly-turned ends of the shoes 34 and 35, and will be deflected or bent over in the direction of the crushing rolls by the turning rod 36 against which they strike. The plants will then be thoroughly shaken and beaten by the several beaters 43 and 47 which operate upon opposite sides thereof, and at the same time will be subject to a further agitation by the guide 37 which vibrates in a vertical plane by reason of its connection with the eccentric strap 39. The thorough agitation to which the deflected plants are subjected under the combined action of the several beaters and the guide will tend to shake the insects which infest the plants onto the trough 32 and the flange 33, whence they fall between the crushing rolls and are destroyed. It will likewise be apparent that the entire machine may be raised or lowered bodily towards and from the ground and may also be tilted in one direction or the other.

The upward movement of the forward ends of the beater stems is checked by a depending yoke 60 against which said stems strike, the arms of the yoke being secured at their ends to the forward face of the cross-beam 14.

Modifications and changes may obviously be made within the scope of the appended claims, as the invention is not intended to be limited to the exact details of construction shown and described.

What is claimed is,

1. In an insect-destroying machine, in combination a wheeled frame including front and rear pairs of supporting beams; a pair of longitudinally-disposed spaced shoes carried by said supporting beams, between which shoes the plants are adapted to pass; a pair of crushing rolls disposed adjacent one of said shoes and parallel therewith; means carried by the other shoe for deflecting the plants towards said rolls; a series of beaters carried by the frame for agitating the plants; and separate means for operating the beaters and rolls.

2. In an insect-destroying machine, in combination, a wheeled frame including front and rear pairs of supporting beams; a pair of longitudinally disposed spaced shoes carried by said beams, between which shoes the plants are adapted to pass; a pair of crushing rolls disposed adjacent one of said shoes and parallel therewith; means carried by the other shoe for deflecting the plants towards said rolls; a beater disposed above each crushing roll for agitating the plants; means for vibrating said beaters alternately; and means for driving said rolls.

3. In an insect-destroying machine, in combination, a wheeled frame including front and rear pairs of supporting beams; a pair of longitudinally-disposed spaced shoes carried by said supporting beams, between which shoes the plants are adapted to pass; a pair of crushing rolls disposed adjacent one of said shoes and parallel therewith; means carried by the other shoe for deflecting the plants towards said rolls; a longitudinal trough disposed directly above one of said rolls and provided with a depending lip extending towards the bite of the rolls; a longitudinal guide carried by said trough and disposed in alinement with said deflecting means; a beater disposed above each crushing roll for agitating the plants; means for vibrating said beaters alternately; and means for driving said rolls.

4. An insect-destroying machine, in combination, a wheeled frame including front and rear pairs of supporting beams; a pair of longitudinally disposed spaced shoes carried by said supporting beams, between which shoes the plants are adapted to pass; a pair of crushing rolls disposed adjacent one of said shoes and parallel therewith; means carried by the other shoe for deflecting the plants towards said rolls; a longitudinal trough disposed directly above one of said rolls and provided with a depending lip extending towards the bite of the rolls; a longitudinal vibrating guide carried by said trough and disposed in alinement with said deflecting means, said guide being adapted to strike against the under portion of the plants; means for actuating said guide; a beater disposed above each crushing roll for agitating the plants; means for vibrating said beaters alternately; and means for driving said rolls.

5. In an insect-destroying machine, in combination, a wheeled frame including front and rear pairs of supporting beams, and crossbeams connecting the members of each pair of supporting beams; a shaft mounted upon said cross-beams; means for rotating said shaft; a pair of longitudinally-disposed spaced shoes carried by said supporting beams, between which shoes the plants are adapted to pass; a pair of rotatable crushing rolls disposed adjacent one of said shoes; a turning rod carried by the opposite shoe for deflecting the vines towards said rolls; a longitudinal trough disposed directly above one of said rolls and provided with a depending lip extending towards the bite thereof; a longitudinal guide pivoted at its forward end to said trough; an eccentric carried by said shaft and provided with a strap connected to the opposite end of said guide, for vibrating the same; driving connections between one of said rolls and said shaft; a beater disposed above each roll for agitating the plants; and means carried by said shaft for operating said beaters alternately.

6. An insect-destroying machine, in combination, a wheeled frame including front and rear pairs of supporting beams and crossbeams connecting the members of each pair of supporting beams; a shaft mounted upon said cross-beams; means for rotating said shaft; a pair of longitudinally-disposed spaced shoes carried by said supporting beams, between which shoes plants are adapted to pass; a pair of rotatable crushing rolls disposed adjacent one of said shoes; a turning-rod carried by the opposite shoe, for deflecting the vines towards said rolls; an upwardly-inclined, transversely-arranged rotatable crank-shaft connected at one end with each of the supporting beams at one side of the frame and at the other end with the adjacent cross-beams; a beater carried by said crank-shafts adapted to agitate the plants; driving connections between one of said crank-shafts and the first-mentioned shaft and driving connections between one of said rolls and said first-mentioned shaft.

7. In an insect-destroying machine, in combination, a wheeled frame including front and rear pairs of supporting beams, and cross-beams connecting the members of each pair of supporting beams; a shaft mounted upon said cross-beams; means for rotating said shaft; a pair of longitudinally-disposed spaced shoes carried by said supporting beams, between which shoes plants are adapted to pass; a pair of rotatable crushing rolls disposed adjacent one of said shoes; a turning rod carried by the opposite shoe, for deflecting the vines towards said rolls; a beater disposed above each crushing roll for agitating the plants; a coil-spring connected at one end to each beater and at the other end to the front cross-beams; a pair of members carried by said shaft and arranged at right-angles to each other, for operating said beaters alternately; and driving connections between said shaft and one of said crushing rolls.

8. In an insect-destroying machine, in combination, a wheeled frame including front and rear pairs of supporting beams, and cross-beams connecting the members of each pair of supporting beams; a shaft mounted upon said cross-beams; means for rotating said shaft; a pair of longitudinally-disposed spaced shoes carried by said supporting beams, between which shoes the plants are adapted to pass; a pair of rotatable crushing rolls disposed adjacent one of said shoes; a turning rod carried by the opposite shoe for deflecting the vines towards said rolls; a beater disposed above each crushing roll for agitating the plants; each beater having an upwardly and forwardly inclined stem pivotally connected with the front cross-beam; a coil-spring connected at one end with the free end of each beater stem and at the other end with said front cross-beam; a pair of S-shaped arms carried by said shaft and arranged at right-angles to each other, for contacting with said beater stems, to operate said beaters alternately; and driving connection between said shaft and one of said crushing rolls.

9. In insect-destroying machines, in combination, a wheeled frame including a front and rear supporting beam, and cross-beams connecting the members of each pair of supporting beams; a shaft mounted upon said cross-beams; means for rotating said shaft; a pair of longitudinally-disposed spaced shoes carried by said supporting beams, between which shoes the plants are adapted to pass; a pair of rotatable crushing rolls disposed adjacent one of said shoes; a turning-rod carried by the opposite shoe, for deflecting the vines towards the said rolls; an upwardly-inclined, transversely-arranged rotatable crank-shaft connected at one end with each of the supporting beams at one side of the frame, and at the other end with the adjacent cross-beams; a beater carried by said crank-shafts and adapted to agitate the plants; driving connections between one of said crank-shafts and the first-mentioned shaft; a longitudinal trough disposed directly above one of said rolls and provided with a curved lip extending towards the bite thereof; a longitudinal, vibratory guide pivoted at one end to said trough; means connected with said first-mentioned shaft and with the opposite side of the guide, for operating the latter; and driving connection between one of said rolls and said shaft.

In testimony whereof, I affix my signature, in presence of two witnesses.

JOSEPH PEIL.

Witnesses:
J. G. PRUEHER,
NETTIE BROOKS.